(12) United States Patent
Fragala et al.

(10) Patent No.: US 12,485,458 B2
(45) Date of Patent: Dec. 2, 2025

(54) METHOD FOR REMOVING LAYERS OF SILICON CARBIDE, AS WELL AS PROCESS AND APPARATUS FOR CLEANING EPITAXIAL REACTOR COMPONENTS

(71) Applicants: LPE S.p.A., Milan (IT); University of Catania, Catania (IT)

(72) Inventors: Maria Elena Fragala, Milan (IT); Giovanni Franco, Catania (IT)

(73) Assignees: LPE S.p.A., Milan (IT); University of Catania, Catania (IT)

( * ) Notice: Subject to any disclaimer, the term of this patent is extended or adjusted under 35 U.S.C. 154(b) by 50 days.

(21) Appl. No.: 18/591,234

(22) Filed: Feb. 29, 2024

(65) Prior Publication Data
US 2024/0293850 A1   Sep. 5, 2024

(30) Foreign Application Priority Data
Mar. 1, 2023   (IT) .......................... 102023000003639

(51) Int. Cl.
*B08B 3/08*   (2006.01)
*B08B 3/12*   (2006.01)

(52) U.S. Cl.
CPC . *B08B 3/12* (2013.01); *B08B 3/08* (2013.01)

(58) Field of Classification Search
CPC .................................. B08B 3/12; B08B 3/08
See application file for complete search history.

(56) References Cited

U.S. PATENT DOCUMENTS

| | | | | |
|---|---|---|---|---|
| 6,280,496 | B1 * | 8/2001 | Kawai | C04B 35/634 419/48 |
| 7,754,609 | B1 * | 7/2010 | Tan | B08B 11/02 438/905 |
| 2001/0024704 | A1 * | 9/2001 | Otsuki | B08B 3/12 428/34.7 |

(Continued)

FOREIGN PATENT DOCUMENTS

| | | |
|---|---|---|
| CN | 104445208 A | 3/2015 |
| WO | 2008157345 A2 | 12/2008 |

OTHER PUBLICATIONS

Anisotropic etching of polycrystalline silicon with a hot Cl2 molecular beam, Keizo Suzuki et al, Cite as: Journal of Applied Physics 64, 3697 (1988); https://doi.org/10.1063/1.341413 Submitted: Mar. 24, 1988 • Accepted: Jun. 21, 1988 • Published Online: Jun. 4, 1998.

(Continued)

*Primary Examiner* — Sharidan Carrillo
(74) *Attorney, Agent, or Firm* — Banner & Witcoff, Ltd.

(57) ABSTRACT

The innovative method is for removing a silicon carbide layer from a bulk piece; the bulk piece comprises a graphite substrate underlying the silicon carbide layer; the method comprises in succession the steps of: a) submerging the bulk piece in a first solution containing nitric acid, b) submerging the bulk piece in a second solution containing hydrofluoric acid and an oxidizing agent, and typically c) submerging the bulk piece in a third solution containing preferably only or essentially deionized water until the layer detaches from the piece; this method can advantageously be used to clean components of an epitaxial reactor e.g. after their use in the reactor in silicon carbide deposition processes.

16 Claims, 3 Drawing Sheets

(56) References Cited

U.S. PATENT DOCUMENTS

2002/0005213 A1* 1/2002 Otsuki .................... C04B 41/91
                                                    134/28
2012/0080053 A1* 4/2012 Hidaka ................. C11D 3/046
                                                    134/3
2024/0293850 A1* 9/2024 Fragala ................ C23C 16/325

OTHER PUBLICATIONS

Silicon Carbide Etching Using Chlorine Trifluoride Gas, Hitoshi Habuka et al 2005 Jpn. J. Appl. Phys. 44 1376.

Silicon Carbide Surface Cleaning and Etching, V. Jokubavicius et al, Department of Physics, Chemistry and Biology (IFM), Linköping University, SE-58183, Linköping, Sweden, Materials Research Forum LLC, Materials Research Foundations 37 (2018), doi: http://dx.doi.org/10.21741/9781945291852.

Silicon Carbide Technology for Blue-Emitting Diodes, W. v. Munch, Institut A fur Werkstoffkunde Technische Universitat Hannover, Germany, Journal of Electronic Materials, vol. 6, No. 4, 1977.

Thermal Etching of 4H—SiC(0001) Si Faces in the Mixed Gas of Chlorine and Oxygen, Tomoaki Hatayama et al 2009 Jpn. J. Appl. Phys. 48 066516.

* cited by examiner

METHOD FOR REMOVING LAYERS OF SILICON CARBIDE, AS WELL AS PROCESS AND APPARATUS FOR CLEANING EPITAXIAL REACTOR COMPONENTS

CROSS-REFERENCE TO RELATED APPLICATION(S)

This Application claims priority to Italian patent application 102023000003639, filed Mar. 1, 2023, the entire contents of which are incorporated herein by reference.

FIELD OF THE INVENTION

This subject matter described and illustrated herein relates to methods for removing layers of silicon carbide, as well as processes and apparatuses for cleaning epitaxial reactor components.

STATE OF THE ART

The recent development of silicon carbide devices requires the use of epitaxial reactors or ovens for the deposition and heat treatment of silicon carbide capable of operating at very high temperatures (typically 1600-1800° C.).

The epitaxial deposition of layers of silicon carbide by chemical vapor phase deposition, known as CVD, at high temperature is a manufacturing process used in the semiconductor industry.

Silicon carbide epitaxial reactors often consist of graphite parts covered with a thin silicon carbide layer.

During epitaxial deposition of silicon carbide on a substrate or wafer in a reactor, the parts of the reactor chamber are also subject to spurious deposition of silicon carbide that accumulates on them until millimeter thicknesses are reached.

These spurious depositions allow a reactor chamber to be used for a relatively short time, for example a few weeks or a few months.

After this time, the chamber must be removed from the reactor and typically treated to remove the silicon carbide layer resulting from spurious depositions.

To date, there are no known "wet cleaning" processes (using acids, bases or oxidizers) suitable for the purpose.

Currently, mechanical abrasion processes involving special abrasive papers and hand labor are used. Using these processes, it is not possible to obtain perfectly clean surfaces, especially where the geometries are not linear. This means that when chamber parts are used in a reactor after cleaning, there are problems with particulate defects and quality of the epitaxial layers deposited on substrate or wafer.

Several methods for removing various materials from microelectronic devices are known from patent document WO 2008/157345 A2. There are countless substances considered in these methods. The effectiveness of these methods is at least doubtful given the vagueness and breadth of what is described. There is a so-called "sixth aspect" that refers to a composition apparently formulated to remove pure silicon carbide or N-doped from a microelectronic device containing it, but neither the degree/type of crystallinity nor the polytyping (which can be, in particular, 3C or 4H or 6H) of the silicon carbide is specified. There are nineteen specifically considered formulations; all contain $H_2SO_4$; many contain HF; only one treatment bath is indicated. "Example 1" involves treating, i.e. "etching", a silicon wafer with a layer of pure silicon carbide or a layer of N-doped silicon carbide with a thickness of 550 Angstrom i.e. 55 nanometers or 0.055 microns; for pure silicon carbide the "etch rate" is 0.27-0.87 nanometers/minute; for doped silicon carbide the "etch rate" is 0.6-4.36 nanometers/minute. These "etch rate" values are incompatible with the thicknesses of the above silicon carbide spurious depositions, which are at least hundreds of microns; in fact, to remove just 100 microns, in the best case, it would take almost 23,000 minutes or almost 400 hours.

Patent document CN 10445208 A contains methods known to remove impurities from edges of polycrystalline silicon ingots. The impurities are composed in particular of silicon carbide and silicon nitride. All methods involve crushing ingot edge material (which contains both polycrystalline silicon and impurities) to a predetermined size, such as 5 to 50 mm. One of the methods involves dipping the crushed material into a solution that may contain, for example, both hydrofluoric acid and nitric acid; the document does not explain the reason for using two different acids; in general, the acid is used to react with the surface silicon molecules. One example of such a method is to also have in solution a strong oxidant, in particular, potassium permanganate or potassium bichromate; the document does not explain the reason for adding such an oxidizing salt.

SUMMARY

It would therefore be desirable to have a method for removing layers of silicon carbide from graphite substrates that is easy to manufacture industrially and does not require a complicated apparatus.

Ideally, this method should be suitable for removing particularly thick layers (hundreds of microns or millimeters) quickly (in few hours, or far less than dozens or hundreds of hours).

This general objective, as well as more specific objectives, are achieved thanks to what is described and illustrated herein, in particular the subject matter of the claims attached hereto.

BRIEF DESCRIPTION OF THE DRAWINGS

This matter will become clearer from the detailed description below, to be considered in conjunction with the accompanying drawings, in which.

It should be noted that the technical characteristics illustrated below in relation to specific examples of implementation are not to be considered limiting of the present invention, which is defined in its main aspects by the claims attached hereto.

It should also be noted that the technical characteristics illustrated below in relation to specific examples of implementation are not to be considered closely linked to each other and therefore mutually binding.

DETAILED DESCRIPTION

Figure 1:
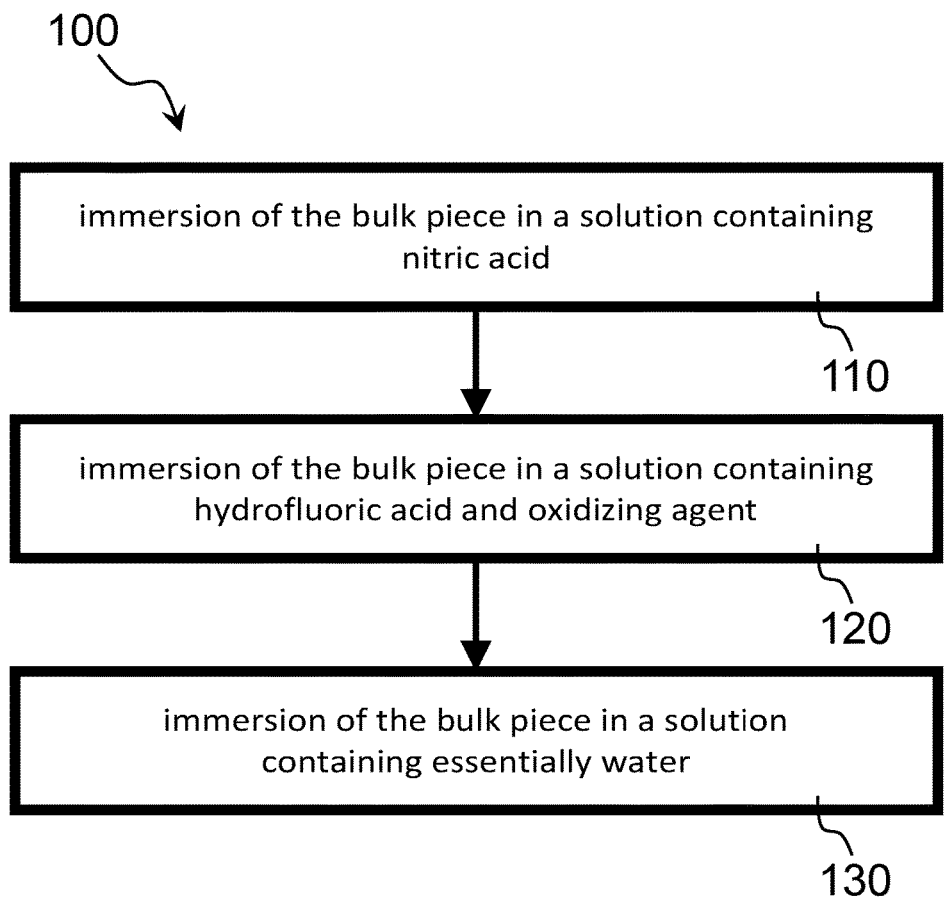
FIG. 1 shows an example flow chart for creating a method for removing a silicon carbide layer from a bulk piece.

The innovative method works to remove a silicon carbide layer from a bulk piece; FIG. 1 shows an example flowchart 100 for implementation of the method.

Figures 2A, 2B:
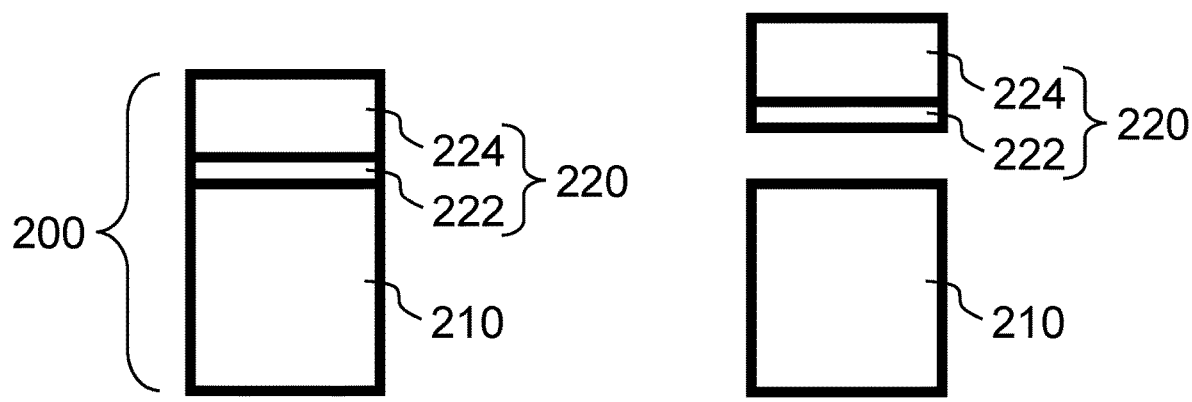
FIG. 2A shows an example of a bulk piece before applying the method of FIG. 1
FIG. 2B shows an example of a bulk piece after applying the method of FIG. 1.

As shown by way of example in FIG. 2A, a bulk piece 200 to be treated comprises a substrate 210 of graphite underlying a layer 220 of silicon carbide. In this example, the layer 220 comprises a thin (e.g. 20-200 nm=nanometers) under-layer 222 of silicon carbide and a thick (e.g. 20-200 um=micrometers) under-layer 224 of silicon carbide overlying the under-layer 222, i.e. adjacent; the sub-layer 222 derives for example from a pre-treatment of the substrate 210 and the sub-layer 224 derives for example from a plurality of spurious depositions (therefore it may be considered to comprise a plurality of overlapping, i.e., adjacent, sub-layers).

Depending on the applications, if the silicon carbide layer is formed from two or more silicon carbide sub-layers, they may be the same or different. For example, sub-layer 222 and the sub-layer 224 are different because they arise from different processes. For example, any sub-layers forming sub-layer 224 are the same because they derive from the same or, at least, similar processes, such as epitaxial deposition processes of silicon carbide on substrates made in epitaxial reactors.

The innovative method according to the example in FIG. 1 comprises the steps of:
  a) submerging (block 110 of diagram 100) the bulk piece 200 in a first solution at a first predetermined temperature, wherein said first solution contains nitric acid at a first predetermined concentration, and keeping it submerged for a first predetermined time,
  and then
  b) submerging (block 120 of plot 100) the bulk piece 200 in a second solution at a second predetermined temperature, wherein said second solution contains hydrofluoric acid at a second predetermined concentration and an oxidizing agent at a third predetermined concentration, and keeping it submerged for a second predetermined time.

As an experienced person in the field may understand, neither of these two steps aims to attack or corrode the silicon carbide layer, but to operate essentially on the substrate, and to cause, or at least promote, detachment of the layer from the substrate. In fact, neither nitric acid, hydrofluoric acid, nor oxidizing agent (individually or in any combination thereof) is capable of significantly attacking or corroding silicon carbide. In addition, if the goal was to attack or corrode the silicon carbide, the removal time for the layer would depend significantly on its thickness.

The first step causes a phenomenon known as "intercalation" that occurs essentially in graphite (nitric acid intercalates particularly well in graphite), particularly in the area of graphite that borders the silicon carbide layer. This phenomenon leads to an increase in the size of the graphite reticle and therefore the creation of tensions at the interface between graphite and silicon carbide.

Subsequently, the second step causes oxidations extended to the interface between graphite and silicon carbide that are allowed by the previous "intercalation"; the oxides that thus form can be attacked by hydrofluoric acid.

The Applicant tried to simplify the treatment, combining nitric acid, hydrofluoric acid and strong oxidizer (particularly potassium permanganate or potassium dichromate) in a single solution, but did not achieve the desired results. Obviously, the three compounds react with each other, in particular by altering the concentration of the individual reagents and thus altering the intercalation and/or oxidation processes.

In particular, step a) and step b) are carried out in such a way as to accentuate and exploit the phenomena described above.

Step b) may directly follow step a), i.e. without any intermediate treatment; in any case, between step a) and step b) it may also take more or less time, for example 1 second or 1 minute or 1 hour. Alternatively, between step a) and step b) there may be at least one intermediate step.

Typically, the method further comprises a step to cause the silicon carbide layer to detach, at least partially, from the bulk piece because simply dipping in the solution referred to in step b) is unlikely to cause such detachment. This phase to cause detachment could be carried out, for example, by subjecting the bulk piece to sound waves, in particular ultrasound or megasound, or by subjecting the bulk piece to a stream of bubbles, in particular of inert gases. It should not be ruled out that, according to some examples of implementation, such a phase aimed at causing detachment may be in whole or in part overlapped with phase b).

Typically and after step b), the method also comprises the step of:
  c) immersing (block 130 of diagram 100) the bulk piece 200 in a third solution at a third predetermined temperature, wherein said third solution preferably contains only or essentially water, in particular deionized water, until detachment (at least partial) of the layer 220 of silicon carbide from the bulk piece 200.

The result after step b) is shown, for example, in FIG. 2B, where the layer 220 is detached (in this case completely) from substrate 210.

It should not be ruled out that detachment of the layer 220 of silicon carbide may, in some cases, cause partial detachment of graphite from the substrate 210, for example small graphite fragments.

There may be alternatives to step c), such as step d) or step e) as described below, to detach the layer from the substrate.

Step d) involves, after step b), subjecting the bulk piece to ultrasound until detachment (at least partial) of the silicon carbide layer from the bulk piece.

Step e) involves, after step b), submerging the bulk piece in a third solution at a third predetermined temperature (the third solution preferably contains only or essentially water, in particular deionized water) and subjecting the bulk piece to ultrasound while submerging it in the third solution until detachment (at least partial) of the silicon carbide layer from the bulk piece.

It is worth making a clarification on the language used in the previous paragraphs. Clearly, if a solution contains only one chemical (e.g. water) it is not, strictly, a solution; the term "solution" was used only to facilitate the formulation of the concept. Furthermore, the term "essentially contains" means that the remaining content is in quantities irrelevant for the treatment.

Typically, the method further comprises a washing step. There can also be more than one wash, for example, a wash immediately after step a) and/or a wash immediately after step b) and/or a wash of the bulk piece after detachment of the silicon carbide layer.

The oxidizing agent is preferably an oxidizing salt, particularly chosen from potassium permanganate and potassium bichromate and other similar oxidizing salts. It should be noted that not all oxidizing agents conventionally used for the treatment of silicon or graphite are effective in the detachment process.

The first predetermined temperature and/or the second predetermined temperature and/or the third predetermined temperature may be chosen in the range from 10° C. to 45°

C., in particular from 15° C. to 40° C. In particular, these temperatures may correspond to "room temperature".

The first time, i.e. the duration of step a), is typically on the order of hours, in particular greater than 3 hours.

The second time, i.e. the duration of step b), is typically on the order of hours, in particular greater than 3 hours.

Such immersion times may depend on the size and geometry of the bulk part and the concentration of acid used.

The first predetermined concentration, i.e. nitric acid, is preferably greater than 60%.

The second predetermined concentration, i.e. hydrofluoric acid, is preferably greater than 40%.

The third predetermined concentration, i.e. oxidizing agent, is a molar concentration preferably between 10 exp-3 ($=10^{-3}$) and 10 exp-1 ($=10^{-1}$).

The innovative method described and claimed herein finds particularly advantageous application in the cleaning of mechanical components of an epitaxial reactor, in particular a reactor for epitaxial deposition of silicon carbide on substrates, after their use in the reactor in deposition processes.

For these applications, the bulk part is a mechanical component of an epitaxial reactor made of graphite and covered, for example, by a thin silicon carbide layer before its use in the reactor; the thickness of this thin silicon carbon layer must be less than 1 micron (or even less). This can be, for example, a part of the reactor chamber or a reactor heater or another component that can be subject to spurious depositions during epitaxial silicon carbide deposition processes; typically such spurious deposition creates a thick silicon carbide layer, which can range in thickness from several tens to hundreds of microns (and can be [as thin as] a few millimeters).

According to some such applications, a process for cleaning mechanical components of an epitaxial reactor comprises such an innovative method, but can also comprise other steps.

According to some such applications, an apparatus for cleaning mechanical components of an epitaxial reactor is configured to accomplish such an innovative method.

Figure 3:
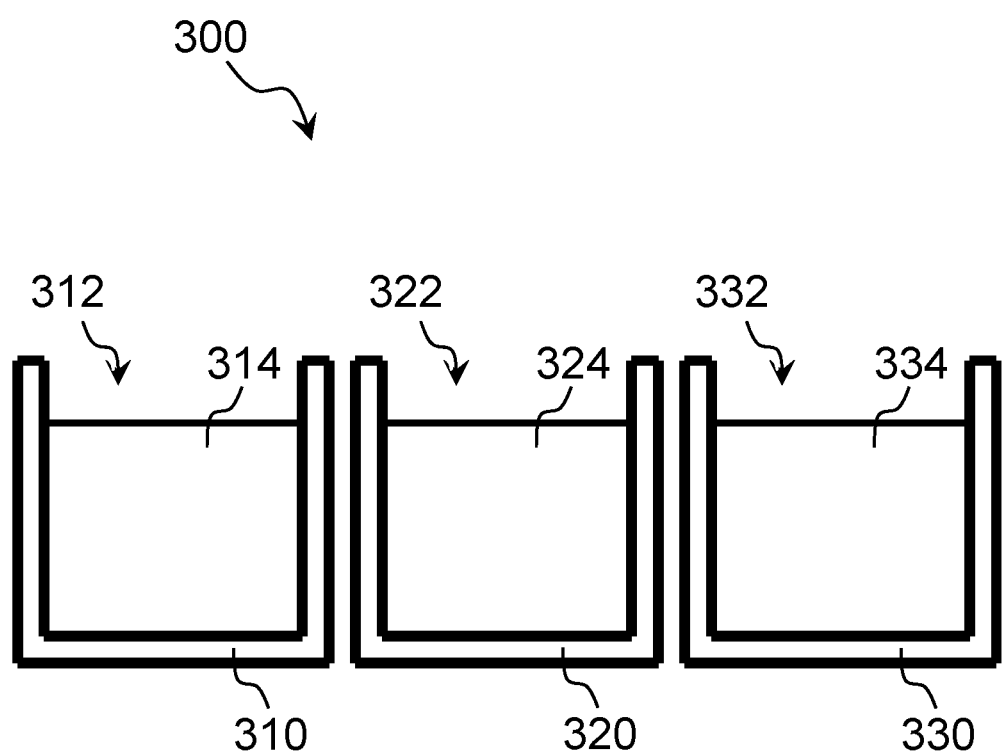
FIG. 3 shows an example of creating an apparatus for cleaning mechanical components of an epitaxial reactor.

An example of such an apparatus is shown in FIG. 3 and referred to collectively with reference 300.

The apparatus 300 comprises a first tub 310, a second tub 320, and a third tub 330. The first tub 310 is provided with a first cavity 312 adapted to hold the first solution 314. The second tub 320 is provided with a second cavity 322 adapted to hold the second solution 324. The third tub 330 is provided with a third cavity 322 adapted to hold the third solution 324.

Apparatus 300 may comprise means (not shown in FIG. 3) for creating the specific solutions according to the innovative methods described herein. In the example of FIG. 3, there is a tub for each solution and so the first solution is created in the first tub, the second solution is created in the second tub, and the third solution is created in the third tub. Alternatively, for example, there can be only one tub; so the first solution is created in the tub, then the first treatment of the component, then the tub is emptied, then the second solution is created in the tub, then the second treatment of the component, then the tub is emptied, then the third solution is created in the tub, then the third treatment of the component, then the tub is emptied.

The apparatus 300 may further comprise means (not shown in FIG. 3) for manipulating the components to be cleaned, in particular for soaking before treatment and extracting a component into and from the solution(s) after treatment.

Figure 4A:
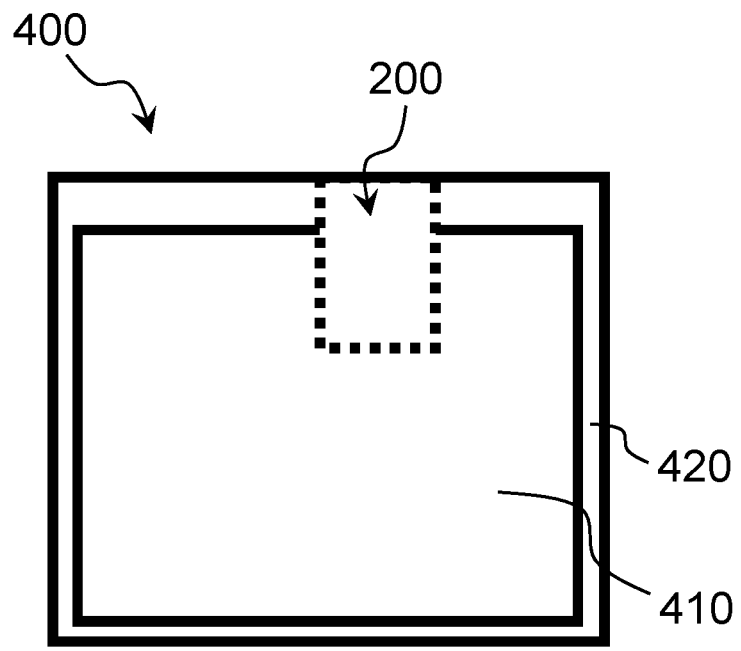
FIGS. 4A and 4B show examples of a mechanical component to be cleaned in two distinct phases before cleaning.
Figure 4B:
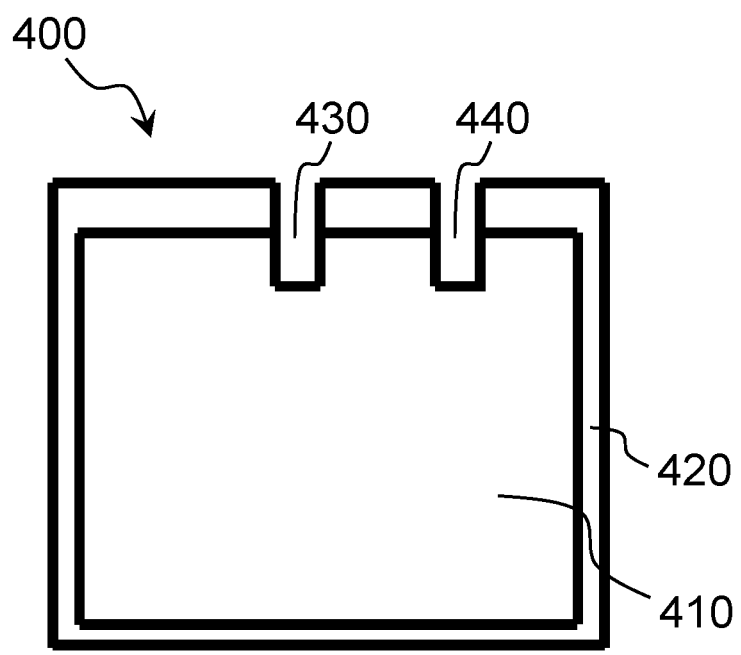

FIGS. 4A and 4B schematically show examples of a mechanical component 400 to be cleaned prior to a cleaning treatment. The heart 410 of such component is made of graphite and is enclosed (in this case entirely) by a silicon carbide layer 420. This is, in particular, a component of a reactor for the epitaxial deposition of silicon carbide onto substrates; the graphite of such components is polycrystalline, so it is not HOPG (=Highly Ordered Pyrolytic Graphite); the silicon carbide deposited in this type of reactor is crystalline and of type 4H or 6H or 3C and therefore also the silicon carbide layer (spurious) to be removed from the component is type 4H or 6H or 3C.

Note, particularly in FIG. 4A, that the thickness of the layer is much lower on the low, right and left sides; for example, this layer may correspond to the thin layer of "native" silicon carbide. Note, particularly in FIG. 4A, that the thickness of the layer is very high on the high side; for example, this top layer could correspond to the overlap of "native" silicon carbide and silicon carbide due to spurious depositions. FIG. 4A, indicates, by way of example, a portion of the component 400 that may correspond to the maximum piece 200 discussed above.

Considering, for example, component 400, before steps a) and b), may advantageously be treated such that at least part of the graphite substrate is exposed. FIG. 4B shows two (but it could be many more) excavations 430 and 440 passing through the silicon carbide layer 410 and reaching the graphite substrate 410; according to this example, the excavations are present at the top layer where the thickness of silicon carbide is high, i.e. where spurious depositions have occurred.

It is evident from FIG. 4B that intercalation (discussed earlier) in the graphite of component 400 is facilitated by exposure by the presence of excavations that expose the graphite itself to bath substances.

It should be noted that the method described and claimed herein can also be applied outside the microelectronic industry, wherever there is a need to remove a silicon carbide layer from a bulk piece comprising an underlying graphite substrate.

Advantageously, the silicon carbide obtained by separation due to such a method can be recycled, for example, also in areas different than the original one of the microelectronics.

Advantageously, graphite obtained by separation due to such a method may be recycled, for example, also in areas different than the original one of the microelectronics.

Such recycling proceedings are advantageous and independently claimable aspects of the subject described herein.

The invention claimed is:

1. A method comprising the steps of:
    (a) submerging a reactor component in a first solution at a first predetermined temperature for a first predetermined time, wherein the reactor component comprises a graphite substrate and a silicon carbide layer overlaying the graphite substrate, and wherein the first solution comprises nitric acid at a first predetermined concentration;
    (b) submerging the reactor component in a second solution at a second predetermined temperature for a second predetermined time, wherein the second solution comprises hydrofluoric acid at a second predetermined concentration and an oxidizing agent at a third predetermined concentration; and
    (c) causing the silicon carbide layer to detach from the reactor component.

2. The method of claim 1, wherein step (c) in whole or in part overlaps with step (b).

3. The method according to claim 1, further comprising at least one intermediate step between step (a) and step (b).

4. The method of claim 1, wherein step (b) directly follows step (a).

5. The method of claim 1, wherein step (c) of causing the silicon carbide layer to detach from the reactor component comprises:
   after step (b), submerging the reactor component in a third solution at a third predetermined temperature, wherein the third solution comprises water; and
   keeping the reactor component submerged in the third solution at least until detachment of the silicon carbide layer from the reactor component.

6. The method of claim 1, wherein step (c) of causing the silicon carbide layer to detach from the reactor component comprises:
   subjecting the reactor component to ultrasound after step (b), at least until the silicon carbide layer detaches from the reactor component.

7. The method according to claim 1, wherein step (c) of causing the silicon carbide layer to detach from the reactor component comprises:
   after step (b);
      submerging the reactor component in a third solution at a third predetermined temperature, wherein said third solution comprises water; and
      subjecting the reactor component to ultrasound while the reactor component is submerged in the third solution at least until detachment of the silicon carbide layer from the reactor component.

8. The method according to claim 1, wherein the method further comprises a washing step.

9. The method according to claim 1, wherein the oxidizing agent is an oxidizing salt comprising potassium permanganate or potassium dichromate.

10. The method of claim 1, wherein the first predetermined time is greater than 3 hours; or
    wherein the second predetermined time is greater than 3 hours.

11. The method of claim 1, wherein the first predetermined concentration of the nitric acid in the first solution is greater than 60%;
    wherein the second predetermined concentration of the hydrofluoric acid in the second solution is greater than 40%; or
    wherein the third predetermined concentration of the oxidizing agent in the second solution is a molar concentration of between $10\exp^{-3}$ and $10\exp^{-1}$.

12. A process for cleaning mechanical components of an epitaxial reactor used for one or more epitaxial depositions of silicon carbide on substrates, wherein the process comprises the method of claim 1 applied to the mechanical components.

13. The method of claim 5, wherein the first predetermined temperature, the second predetermined temperature, or the third predetermined temperature is chosen in a range from 10° C.

14. The method of claim 5, wherein the first predetermined temperature, the second predetermined temperature, or the third predetermined temperature is chosen in a range from −15° C. to 40° C.

15. The method according to claim 5, wherein the water comprises ionized water.

16. The process of claim 12, wherein, prior to steps (a) and (b), the mechanical components are treated such that the graphite substrate is at least partly exposed.

* * * * *